(12) United States Patent
Beall et al.

(10) Patent No.: US 12,291,987 B2
(45) Date of Patent: May 6, 2025

(54) EXHAUST TREATMENT METHOD AND APPARATUS HAVING PARTICULATE FILTERS AND SCR

(71) Applicant: CORNING INCORPORATED, Corning, NY (US)

(72) Inventors: Douglas Munroe Beall, Painted Post, NY (US); Sam George, Naperville, IL (US); Mahesh Govindareddy, Painted Post, NY (US); Achim Karl-Erich Heibel, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 18/284,430

(22) PCT Filed: Apr. 5, 2022

(86) PCT No.: PCT/US2022/023413
§ 371 (c)(1),
(2) Date: Sep. 27, 2023

(87) PCT Pub. No.: WO2022/216658
PCT Pub. Date: Oct. 13, 2022

(65) Prior Publication Data
US 2024/0159174 A1     May 16, 2024

Related U.S. Application Data

(60) Provisional application No. 63/315,334, filed on Mar. 1, 2022, provisional application No. 63/291,573, filed
(Continued)

(51) Int. Cl.
*F01N 3/022* (2006.01)
*B01D 46/24* (2006.01)
(Continued)

(52) U.S. Cl.
CPC ..... *F01N 3/0222* (2013.01); *B01D 46/24491* (2021.08); *B01D 46/24492* (2021.08);
(Continued)

(58) Field of Classification Search
CPC combination set(s) only.
See application file for complete search history.

(56) References Cited

U.S. PATENT DOCUMENTS 10,502,107 B2 * 12/2019 Bleckmann ........ B01D 53/9436
11,674,422 B2 *  6/2023 Norris .................... F01N 3/106
                                                               60/286
(Continued)

FOREIGN PATENT DOCUMENTS

CN      101548071 B    1/2013
EP        3772573 A1    2/2021

OTHER PUBLICATIONS

Robinson et al; "The Effect of Diesel Exhaust Fluid Dosing on Tailpipe Particle Number Emissions"; SAE Technical Paper 2016-01-0995, 2016.
(Continued)

*Primary Examiner* — Binh Q Tran
(74) *Attorney, Agent, or Firm* — Kevin M. Able

(57) ABSTRACT

An exhaust treatment method and apparatus for treating an exhaust stream flowing through an exhaust line housing in a downstream direction, the apparatus comprising a first particulate filter, an SCR unit, and a second particulate filter downstream of the SCR unit, all serially positioned in the exhaust line.

19 Claims, 8 Drawing Sheets

Related U.S. Application Data on Dec. 20, 2021, provisional application No. 63/171,454, filed on Apr. 6, 2021, provisional application No. 63/170,823, filed on Apr. 5, 2021.

(51) Int. Cl.
  *B01D 46/62* (2022.01)
  *B01D 53/94* (2006.01)
  *F01N 3/023* (2006.01)
  *F01N 3/029* (2006.01)
  *F01N 3/08* (2006.01)
  *F01N 3/20* (2006.01)
  *F01N 13/00* (2010.01)

(52) U.S. Cl.
  CPC ......... *B01D 46/2484* (2021.08); *B01D 46/62* (2022.01); *B01D 53/9431* (2013.01); *F01N 3/2066* (2013.01); *F01N 13/009* (2014.06); *B01D 46/2418* (2013.01); *B01D 46/2425* (2013.01); *B01D 46/2429* (2013.01); *B01D 53/9418* (2013.01); *B01D 53/9422* (2013.01); *B01D 2251/2067* (2013.01); *B01D 2258/01* (2013.01); *B01D 2279/30* (2013.01); *F01N 3/023* (2013.01); *F01N 3/0231* (2013.01); *F01N 3/029* (2013.01); *F01N 3/0814* (2013.01); *F01N 3/0871* (2013.01); *F01N 3/206* (2013.01); *F01N 3/208* (2013.01); *F01N 2330/06* (2013.01); *F01N 2330/48* (2013.01); *F01N 2610/1453* (2013.01)

(56) References Cited

U.S. PATENT DOCUMENTS

| | | |
|---|---|---|
| 2006/0021335 A1 | 2/2006 | Opris |
| 2008/0120968 A1 | 5/2008 | Beall et al. |
| 2011/0011067 A1 | 1/2011 | Ren et al. |
| 2014/0165540 A1* | 6/2014 | Fischer ................. F01N 13/009 422/162 |
| 2016/0166990 A1* | 6/2016 | Phillips ................. F01N 3/0222 422/171 |
| 2017/0361273 A1* | 12/2017 | Zoran ................. B01D 53/9477 |
| 2018/0117573 A1* | 5/2018 | Fedeyko ................. B01J 29/78 |
| 2018/0272281 A1 | 9/2018 | Makino et al. |
| 2022/0034245 A1* | 2/2022 | Wang ................. F01N 3/022 |
| 2022/0389853 A1* | 12/2022 | Lei ................. F01N 3/00 |

OTHER PUBLICATIONS

International Search Report and Written Opinion of the International Searching Authority; PCT/US2022/023413; mailed on Jun. 22, 2022, 11 pages; European Patent Office.

* cited by examiner

| | | Diesel Oxidation Catalyst Substrate (cells/square inch, CPSI) | First Particulate Filter | Selective Catalytic Reduction Catalyst Substrate | Second Particulate Filter |
|---|---|---|---|---|---|
| A | Baseline | 400/4 | Diesel Particulate Filter DC LP 300/9 ACT Coated | 600/3 Coated SCR | None |
| C | | 400/4 | Diesel Particulate Filter 300/9 ACT Coated, large inlet cells, alternately plugged, 50% bulk average porosity, 19 micrometer bulk median pore size (d50), cordierite | 600/3 Coated SCR | Ø13"×7" long Filter with 200/8 square cells alternately plugged, uncoated, 55% bulk average porosity, 12 micrometer bulk median pore size (d50), cordierite |
| C prime | | 400/4 | Diesel Particulate Filter AC 300/9 ACT Coated, large inlet cells, alternately plugged, 50% bulk average porosity, 19 micrometer bulk median pore size (d50), cordierite | 600/3 Coated SCR | Ø13"×7" long Filter with 200/8 square cells alternately plugged, 55% bulk average porosity, 12 micrometer bulk median pore size (d50), uncoated with Inorganic Filtration Particles added on inlet channels, cordierite |
| C with soot | | 400/4 | Diesel Particulate Filter AC 300/9 ACT Coated, large inlet cells, alternately plugged, 50% bulk average porosity, 19 micrometer bulk median pore size (d50), cordierite | 600/3 Coated SCR | Ø13"×7" long Filter with 200/8 square cells alternately plugged, 55% bulk average porosity, 12 micrometer bulk median pore size (d50), uncoated with soot layer added, cordierite |
| D | | 400/4 | Diesel Particulate Filter AC 300/9 ACT Coated, large inlet cells, alternately plugged, 50% bulk average porosity, 19 micrometer bulk median pore size (d50), cordierite | 600/3 Coated SCR | Ø13"×4.5" long with 300/5 Substrate, square cells alternately plugged, 35% bulk average porosity, 4 micrometer bulk median pore size (d50), uncoated, cordierite |
| E | | 400/4 | Diesel Particulate Filter AC 300/9 ACT Coated, large inlet cells, alternately plugged, 50% bulk average porosity, 19 micrometer bulk median pore size (d50), cordierite | 600/3 Coated SCR | Ø13"×4.5" long 400/4 Substrate, square cells alternately plugged, 35% bulk average porosity, 4 micrometer bulk median pore size (d50), uncoated, cordierite |

FIG. 3

EXHAUST TREATMENT METHOD AND APPARATUS HAVING PARTICULATE FILTERS AND SCR

CROSS REFERENCE TO RELATED APPLICATION

This is a national stage application under 35 U.S.C. § 371 of International Application No. PCT/US2022/023413, filed on Apr. 5, 2022, which claims the benefit of priority under 35 U.S.C. § 119 of U.S. Provisional Application Ser. No. 63/315,334 filed on Mar. 1, 2022, U.S. Provisional Application Ser. No. 63/291,573 filed on Dec. 20, 2021, U.S. Provisional Application Ser. No. 63/171,454 filed on Apr. 6, 2021, and U.S. Provisional application Ser. No. 63/170,823 filed on Apr. 5, 2021, the content of which is relied upon and incorporated herein by reference in their entireties.

TECHNICAL FIELD

Embodiments of the present disclosure generally relate to engine exhaust treatment, in particular exhaust treatment apparatus and method that comprises particulate filtration and SCR treatment.

BACKGROUND

Particulate filters, for example, diesel particulate filters (DPFs), filter particulates from the exhaust stream from engines such as engines burning diesel fuel. Many exhaust treatment systems use a selective catalytic reduction (SCR) component which utilize injection of a reducing agent such as ammonia or urea.

SUMMARY

In one aspect, an exhaust treatment apparatus is disclosed herein for treating an exhaust stream flowing through an exhaust line housing in a downstream direction from an upstream location of the exhaust line housing to a downstream location, the exhaust treatment apparatus comprising: upstream components comprising one or more urea injector/mixer components including a last urea injector/mixer component; and a particulate filter disposed downstream of the last urea injector/mixer component. That is, one or more particulate filters is disposed downstream of the most downstream situated of the urea injector/mixer components, i.e. the most downstream urea injector/mixer component. In embodiments, the upstream components further comprise one or more diesel oxidation catalyst (DOC) components, one or more mixing duct components, one or more ammonia slip catalyst (ASC) components, and/or one or more electrically heatable components comprising one or more heater components and/or one or more electrically heatable catalyst (EHC) components. In embodiments, at least one of the upstream components is configured for close-coupled mounting.

In another aspect, an exhaust treatment apparatus is disclosed herein for treating an exhaust stream flowing through an exhaust line housing in a downstream direction from an upstream location of the exhaust line housing to a downstream location, the exhaust treatment apparatus comprising: upstream components comprising at least one particulate filter and one or more SCR units; and a final particulate filter disposed downstream of the upstream components. That is, the final particulate filter is disposed downstream of the most downstream situated of the upstream components. The particulate filter located downstream of the most downstream situated of the upstream components can either be an uncatalyzed particulate filter (for example, no added catalyst material) or the particulate filter can be catalyzed, i.e. coated with SCR functionality catalyst material, ammonia oxidation functionality material, or both. In embodiments, the upstream components further comprise one or more diesel oxidation catalyst (DOC) components, one or more urea injector components, one or more mixing duct components, one or more ammonia slip catalyst (ASC) components, and/or one or more electrically heatable components comprising one or more heater components and/or one or more electrically heatable catalyst (EHC) components. In embodiments, at least one of the upstream components is configured for close-coupled mounting.

As used herein, an SCR component may comprise an SCR/ASC (ammonia slip catalyst or ammonia oxidation catalyst) component where the function of ASC is ammonia oxidation, and in some embodiments where the particulate filter is downstream of the most downstream situated of the upstream components, it could be uncatalyzed or coated with SCR functionality, ammonia oxidation functionality, or both.

In another aspect, an exhaust treatment apparatus is disclosed herein for treating an exhaust stream flowing through an exhaust line housing in a downstream direction from an upstream location of the exhaust line housing to a downstream location, the exhaust treatment apparatus comprising: a first particulate filter; an SCR unit disposed downstream of the first particulate filter; and a second particulate filter disposed downstream of the SCR unit; wherein the first particulate filter, the SCR unit, and the second particulate filter are disposed serially in the exhaust line housing and are configured to allow the exhaust stream to flow serially through the first particulate filter, subsequently through the SCR unit, and subsequently through the second particulate filter. The SCR unit may comprise a reducing agent doser configured to inject a reducing agent into the exhaust gas in the exhaust line housing downstream of the first particulate filter. In embodiments, the SCR unit further comprises a selective catalytic reduction catalyst.

The first particulate filter may be comprised of a first honeycomb body comprised of intersecting porous ceramic walls comprising a first bulk average porosity as measured by mercury porosimetry, and the second particulate filter is comprised of a second honeycomb body comprised of intersecting porous ceramic walls comprising a second bulk average porosity as measured by mercury porosimetry, wherein the second honeycomb body comprises a second bulk median pore size which is less than a first bulk median pore size of the first honeycomb body.

The first particulate filter may be comprised of a first honeycomb body comprised of intersecting porous ceramic walls comprising a first bulk average porosity of 40-65% as measured by mercury porosimetry, and the second particulate filter is comprised of a second honeycomb body comprised of intersecting porous ceramic walls comprising a second bulk average porosity of 35-55% as measured by mercury porosimetry.

The first bulk average porosity micrometers. The second honeycomb body may comprise a second bulk median pore size which is less than a first bulk median pore size of the first honeycomb body.

In embodiments, the first particulate filter is comprised of a first honeycomb body comprised of intersecting porous ceramic walls comprising a first bulk median pore size of 12-30 micrometers as measured by mercury porosimetry, and the second particulate filter is comprised of a second honeycomb body comprised of intersecting porous ceramic walls comprising a second bulk median pore size of 2-12 micrometers as measured by mercury porosimetry, and wherein the second bulk median pore size is less than the first bulk median pore size.

In embodiments, the first particulate filter is comprised of a honeycomb body comprised of intersecting porous ceramic walls comprising a bulk average porosity of 40-65% as measured by mercury porosimetry. In embodiments, the porous ceramic walls comprise a bulk average porosity of 42-55% as measured by mercury porosimetry. In embodiments, the porous ceramic walls comprise a bulk median pore size of 5 to 15 μm as measured by mercury porosimetry. In embodiments, the porous ceramic walls comprise a bulk median pore size of 7 to 12 μm as measured by mercury porosimetry.

In embodiments, the first particulate filter is comprised of a first honeycomb body comprised of intersecting porous ceramic walls comprising a first bulk average porosity as measured by mercury porosimetry, and the second particulate filter is comprised of a second honeycomb body comprised of intersecting porous ceramic walls comprising a second bulk average porosity as measured by mercury porosimetry, and the second bulk average porosity is greater than the first bulk average porosity.

In embodiments, the first particulate filter is comprised of a first honeycomb body comprised of intersecting porous ceramic walls defining axial channels, wherein the first honeycomb body further comprises plugs selectively disposed in at least some of the axial channels to further define inlet channels and outlet channels and to provide a plurality of gas flow paths through selected porous ceramic walls. In embodiments, at least some of the inlet channels have a cross-sectional channel open area greater than a cross-sectional channel open area of at least some of the outlet channels. In embodiments, the second may be 48-62%. The first bulk average porosity may be 50-55%. The second bulk average porosity may be 40-55%. The second honeycomb body may comprise a second bulk median pore size of 5-12 micrometers. The second honeycomb body may comprise a second bulk median pore size of 6-12
particulate filter is comprised of a second honeycomb body comprised of intersecting porous ceramic walls defining axial channels, wherein the second honeycomb body further comprises plugs selectively disposed in at least some of the axial channels to further define inlet channels and outlet channels and to provide a plurality of gas flow paths through selected porous ceramic walls. In embodiments, a majority of the inlet channels and a majority of the outlet channels in the second particulate filter have essentially the same cross-sectional channel open area.

In another aspect, a method of treating an exhaust stream is disclosed herein, the method comprising: flowing the exhaust stream through a first particulate filter, then, after flowing through the first particulate filter, flowing the exhaust stream through an SCR unit, then after being exposed to the Selective catalytic reduction catalyst, flowing the exhaust stream through a second particulate filter.

In embodiments, in the SCR unit, the exhaust stream is mixed with a reducing agent, and the mixture of the exhaust stream with the reducing agent is flowed through a selective catalytic reduction catalyst. In embodiments, after being exposed to the Selective catalytic reduction catalyst, the exhaust stream is flowed through a second particulate filter.

In embodiments, prior to entering the first particulate filter, the exhaust stream is exposed to an oxidation catalyst.

In embodiments, the oxidation catalyst is a diesel oxidation catalyst. In embodiments, the exhaust stream entering the first particulate filter is comprised of exhaust gas and particles. In embodiments, the exhaust stream entering the first particulate filter comprises soot particles. In embodiments, the exhaust stream entering the second particulate filter comprises SCR unit-generated particles.

In embodiments, at least some of the particles from the exhaust stream are removed by the first particulate filter. In embodiments, at least some of the soot particles from the exhaust stream are removed by the first particulate filter. In embodiments, greater than 80% of the soot particles entering the first particulate filter are removed by the first particulate filter. In embodiments, at least some of the soot particles entering the second particulate filter are removed the second particulate filter. In embodiments, the flowing through the second particulate filter removes at least some of the particles from the exhaust stream. In embodiments, the exhaust stream entering the second particulate filter comprises SCR unit-generated particles. In embodiments, the flowing through the second particulate filter removes at least some of the SCR unit—generated particles entering the second particulate filter.

In embodiments, the flowing through the second particulate filter removes at least some of the SCR unit—generated particles entering the second particulate filter. In embodiments, the exposing of the exhaust stream with the reducing agent to the selective catalytic reduction catalyst adds SCR-generated particles to the exhaust stream. In embodiments, the SCR-generated particles comprise SCR reaction byproduct particles. In embodiments, the second particulate filter is configured to remove at least some of the SCR reaction byproduct particles.

In another aspect, a method is disclosed herein of treating exhaust stream comprising exhaust gas and particles, the method comprising: flowing the exhaust stream through a first particulate filter configured to remove at least some of the particles from the exhaust stream, then flowing the exhaust stream through an SCR unit wherein a reducing agent is introduced into the exhaust gas stream, then flowing the exhaust stream through a second particulate filter configured to remove at least some of the particles from the exhaust stream.

In another aspect, a method is disclosed herein of treating an exhaust stream comprising exhaust gas and particles, the method comprising: flowing the exhaust stream through a first particulate filter configured to remove at least some of the particles from the exhaust stream, then flowing the exhaust stream through an SCR unit wherein a reducing agent is introduced into the exhaust gas stream to induce a selective catalytic reaction within the exhaust stream, then flowing the exhaust stream through a second particulate filter configured to remove at least some of the particles from the exhaust stream.

In embodiments, the selective catalytic reaction adds SCR-generated particles to the exhaust stream, and the second particulate filter is configured to remove at least some of the SCR-generated particles. In embodiments, the particles entering the first particulate filter are primarily soot particles. In embodiments, the selective catalytic reaction adds SCR-generated particles to the exhaust stream, and the second particulate filter is configured to remove at least some of the SCR-generated particles. In embodiments, the SCR-generated particles comprise NH3-based particles.

In embodiments, the method further comprises regenerating the first particulate filter while flowing the exhaust stream through the second particulate filter. In embodiments, the first particulate filter has an internal temperature of greater than 550° C. during the regenerating.

Additional embodiments of the disclosure are disclosed herein.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3 lists various exhaust treatment apparatuses that were tested with a heavy duty diesel engine.

DETAILED DESCRIPTION

Figure 1:
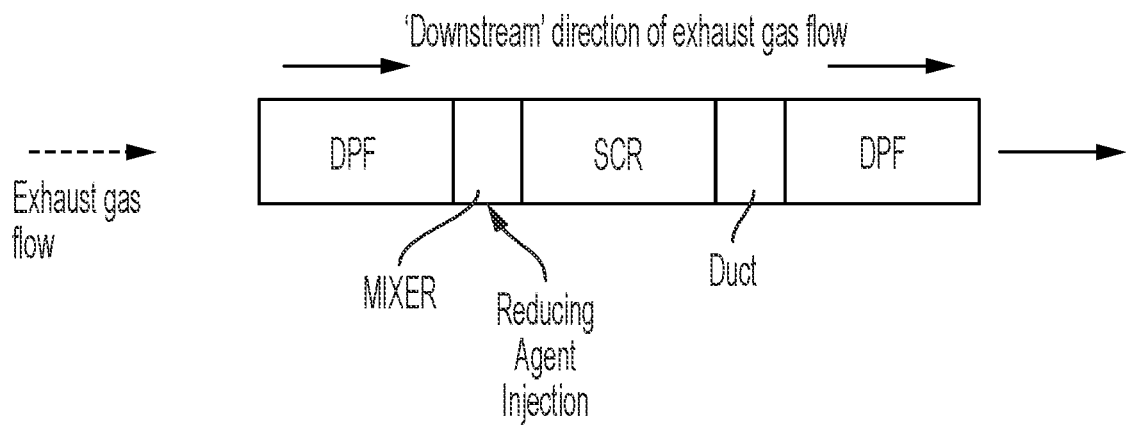
FIG. 1 schematically illustrates an apparatus or a subassembly or an exhaust system comprising an exhaust line comprising a first particulate filter+SCR unit+second particulate filter architecture, such as a DPF+SCR unit+DPF architecture, wherein the SCR unit comprises an injector disposed upstream of a substrate provided with a Selective Catalytic Reduction catalyst material (SCR), with an optional duct disposed in the exhaust line between the SCR and the second particulate filter.

Before describing several exemplary embodiments of the disclosure, it is to be understood that the disclosure is not limited to the details of construction or process steps set forth in the following description. The disclosure is capable of other embodiments and of being practiced or being carried out in various ways.

For exhaust treatment systems that use a selective catalytic reduction (SCR) component which utilize injection of a reducing agent such as ammonia or urea, under non-ideal conditions there is potential that a reducing agent or byproducts thereof or byproducts of the SCR reaction may produce additional particles ("SCR particles") that are added to the exhaust stream and contribute tailpipe out particulate emissions. An exhaust system may comprise an exhaust line comprising a DOC+DPF+SCR architecture with an injector and mixer system upstream of the SCR which delivers a reducing agent like ammonia or urea or mixtures containing ammonia or urea, like Diesel Exhaust Fluid ("DEF") or "AdBlue™" which is an aqueous solution of 32.5% urea and 67.5% DI water.

In one aspect, an exhaust treatment apparatus is disclosed herein for treating an exhaust stream flowing through an exhaust line housing in a downstream direction from an upstream location of the exhaust line housing to a downstream location, the exhaust treatment apparatus comprising: a first particulate filter; an SCR unit disposed downstream of the first particulate filter; and a second particulate filter disposed downstream of the SCR unit; wherein the first particulate filter, the SCR unit, and the second particulate filter are disposed serially in the exhaust line housing and are configured to allow the exhaust stream to flow serially through the first particulate filter, subsequently through the SCR unit, and subsequently through the second particulate filter. The SCR unit may comprise a reducing agent doser configured to inject a reducing agent into the exhaust gas in the exhaust line housing downstream of the first particulate filter, and the SCR unit may further comprise a selective catalytic reduction catalyst.

In some embodiments, the first particulate filter is comprised of a first honeycomb body comprised of intersecting porous ceramic walls comprising a first bulk average porosity as measured by mercury porosimetry, and the second particulate filter is comprised of a second honeycomb body comprised of intersecting porous ceramic walls comprising a second bulk average porosity as measured by mercury porosimetry, wherein the second honeycomb body comprises a second bulk median pore size which is less than a first bulk median pore size of the first honeycomb body.

In some embodiments, the first particulate filter is comprised of a first honeycomb body comprised of intersecting porous ceramic walls comprising a first bulk average porosity of 40-65% as measured by mercury porosimetry, and the second particulate filter is comprised of a second honeycomb body comprised of intersecting porous ceramic walls comprising a second bulk average porosity of 35-55% as measured by mercury porosimetry.

In some of these embodiments, the first bulk average porosity is 48-62%.

In some of these embodiments, the first bulk average porosity is 50-55%. In some of these embodiments, the second bulk average porosity is 40-55%.

In some embodiments, the second honeycomb body comprises a second bulk median pore size of 5-22 micrometers; in some of these embodiments the second honeycomb body comprises a second bulk median pore size of 5-12 micrometers.

In some embodiments, the second honeycomb body comprises a second bulk median pore size of 6-22 micrometers; in some of these embodiments the second honeycomb body comprises a second bulk median pore size of 6-12 micrometers.

In some embodiments, the second honeycomb body comprises a second bulk median pore size which is less than a first bulk median pore size of the first honeycomb body.

In some embodiments, the first particulate filter is comprised of a first honeycomb body comprised of intersecting porous ceramic walls comprising a first bulk median pore size of 12-30 micrometers as measured by mercury porosimetry, and the second particulate filter is comprised of a second honeycomb body comprised of intersecting porous ceramic walls comprising a second bulk median pore size of 2-22 micrometers as measured by mercury porosimetry, and wherein the second bulk median pore size is less than the first bulk median pore size; in some of these embodiments the second honeycomb body comprises a second bulk median pore size of 2-12 micrometers.

In some embodiments, the first particulate filter is comprised of a honeycomb body comprised of intersecting porous ceramic walls comprising a bulk average porosity of 40-65% as measured by mercury porosimetry.

In some of these embodiments, the porous ceramic walls comprise a bulk average porosity of 42-55% as measured by mercury porosimetry.

In some of these embodiments, the porous ceramic walls comprise a bulk median pore size of 5 to 15 nm as measured by mercury porosimetry.

In some of these embodiments, the porous ceramic walls comprise a bulk median pore size of 7 to 12 nm as measured by mercury porosimetry.

In some embodiments, the first particulate filter is comprised of a first honeycomb body comprised of intersecting porous ceramic walls comprising a first bulk average porosity as measured by mercury porosimetry, and the second particulate filter is comprised of a second honeycomb body comprised of intersecting porous ceramic walls comprising a second bulk average porosity as measured by mercury porosimetry, and the second bulk average porosity is greater than the first bulk average porosity.

In some embodiments, the first particulate filter is comprised of a first honeycomb body comprised of intersecting porous ceramic walls defining axial channels, wherein the first honeycomb body further comprises plugs selectively disposed in at least some of the axial channels to further define inlet channels and outlet channels and to provide a plurality of gas flow paths through selected porous ceramic walls.

In some of these embodiments, at least some of the inlet channels have a cross-sectional channel open area greater than a cross-sectional channel open area of at least some of the outlet channels.

In some of these embodiments, the second particulate filter is comprised of a second honeycomb body comprised of intersecting porous ceramic walls defining axial channels, wherein the second honeycomb body further comprises plugs selectively disposed in at least some of the axial channels to further define inlet channels and outlet channels and to provide a plurality of gas flow paths through selected porous ceramic walls; in some of these embodiments, a majority of the inlet channels and a majority of the outlet channels in the second particulate filter have essentially the same cross-sectional channel open area.

In another aspect, a method is disclosed herein of treating an exhaust stream, the method comprising: flowing the exhaust stream through a first particulate filter, then, after flowing through the first particulate filter, flowing the exhaust stream through an SCR unit, then after being exposed to the SCR unit, flowing the exhaust stream through a second particulate filter.

In some embodiments, in the SCR unit, the exhaust stream is mixed with a reducing agent, and the mixture of the exhaust stream with the reducing agent is flowed through a selective catalytic reduction catalyst.

In some embodiments, after being exposed to the Selective catalytic reduction catalyst, flowing the exhaust stream through a second particulate filter.

In some embodiments, prior to entering the first particulate filter, the exhaust stream is exposed to an oxidation catalyst; in some of these embodiments, the oxidation catalyst is a diesel oxidation catalyst.

In some embodiments, the exhaust stream entering the first particulate filter is comprised of exhaust gas and particles.

In some of these embodiments, the exhaust stream entering the first particulate filter comprises soot particles.

In some of these embodiments, the exhaust stream entering the second particulate filter comprises SCR unit-generated particles.

In some of these embodiments, at least some of the particles from the exhaust stream are removed by the first particulate filter.

In some of these embodiments, at least some of the soot particles from the exhaust stream are removed by the first particulate filter; in some of these embodiments, greater than 80% of the soot particles entering the first particulate filter are removed by the first particulate filter; in some of these embodiments, at least some of the soot particles entering the second particulate filter are removed by the second particulate filter.

In some of these embodiments, the flowing through the second particulate filter removes at least some of the particles from the exhaust stream.

In some of these embodiments, the exhaust stream entering the second particulate filter comprises SCR unit-generated particles; in some of these embodiments, the flowing through the second particulate filter removes at least some of the SCR unit—generated particles entering the second particulate filter, in some of these embodiments, the flowing through the second particulate filter removes at least some of the SCR unit—generated particles entering the second particulate filter.

In some embodiments, the exposing of the exhaust stream with the reducing agent to the selective catalytic reduction catalyst adds SCR-generated particles to the exhaust stream; in some of these embodiments, the SCR-generated particles comprise SCR reaction byproduct particles; in some of these embodiments, the second particulate filter is configured to remove at least some of the SCR reaction byproduct particles.

In another aspect, a method is disclosed herein of treating exhaust stream comprising exhaust gas and particles, the method comprising: flowing the exhaust stream through a first particulate filter configured to remove at least some of the particles from the exhaust stream, then flowing the exhaust stream through an SCR unit wherein a reducing agent is introduced into the exhaust gas stream, then flowing the exhaust stream through a second particulate filter configured to remove at least some of the particles from the exhaust stream.

In another aspect, a method is disclosed herein of treating an exhaust stream comprising exhaust gas and particles, the method comprising: flowing the exhaust stream through a first particulate filter configured to remove at least some of the particles from the exhaust stream, then flowing the exhaust stream through an SCR unit wherein a reducing agent is introduced into the exhaust gas stream to induce a selective catalytic reaction within the exhaust stream, then flowing the exhaust stream through a second particulate filter configured to remove at least some of the particles from the exhaust stream.

In some embodiments, the selective catalytic reaction adds SCR-generated particles to the exhaust stream, and the second particulate filter is configured to remove at least some of the SCR-generated particles.

In some embodiments, the particles entering the first particulate filter are primarily soot particles.

In some embodiments, the selective catalytic reaction adds SCR-generated particles to the exhaust stream, and the second particulate filter is configured to remove at least some of the SCR-generated particles; in some of these embodiments, the SCR-generated particles comprise NH3-based particles.

In some embodiments, the method further comprises generating the first particulate filter while flowing the exhaust stream through the second particulate filter.

In some embodiments, the first particulate filter has an internal temperature of greater than 550° C. during the regeneration.

In some embodiments, the method further comprises not regenerating the second particulate filter before the first particulate filter is regenerated.

In some embodiments, the method further comprises not regenerating the second particulate filter before the first particulate filter is replaced, or subjected to ash cleaning.

In some embodiments, the reducing agent injection portion is coupled to an SCR unit; and some of these embodiments the reducing agent doser is disposed upstream of an SCR unit; in other of these embodiments the reducing agent doser is incorporated into the SCR unit.

In some embodiments the reducing agent comprises ammonia, urea, or a combination thereof, or a mixture of ammonia or urea with another fluid, such as deionized (DI) water.

In some environments, the exhaust apparatus further comprises a diesel oxidation catalyst (DOC) unit disposed upstream of the particulate filter in the exhaust line.

In some embodiments, the porous material of the honeycomb bodies is comprised of one or more selected from the group of cordierite, aluminum titanate, magnesium titanate, silica carbide, mullite, alumina, spinel, and combinations thereof.

In some embodiments, the exhaust treatment apparatus further comprises one or more catalytic exhaust components disposed within the exhaust line housing.

In some of these embodiments, one or more of the catalytic exhaust components is selected from the group consisting of a DOC component, an SCR component, and an LNT component.

In some embodiments, the exhaust treatment apparatus further comprises a reducing agent injector coupled to the reducing agent injector junction.

In some embodiments the exhaust treatment apparatus further comprises a reducing agent doser.

In some embodiments, the matrix of intersecting walls of the filter body comprises cells present in a pattern of 100 to 600 cells per square inch.

In some embodiments, the matrix of intersecting walls of the filter body comprises cells present in a pattern of substantially similarly shaped cells.

In some embodiments, the matrix of intersecting walls of the filter body comprises cells present in a pattern of substantially similarly sized cells.

In some embodiments, the outlet channels of the filter body are larger in area than the inlet channels of the filter body.

In some embodiments, at least one of the particulate filters further comprises catalyst material disposed on, in, or both on and in at least a portion of the intersecting walls of the honeycomb body.

FIG. 1 schematically illustrates an apparatus or a subassembly or an exhaust system comprising an exhaust line comprising a first particulate filter+SCR unit+second particulate filter architecture, such as a DPF+SCR unit+DPF architecture, wherein the SCR unit comprises an injector disposed upstream of a substrate provided with a Selective Catalytic Reduction catalyst material (SCR), with an optional duct disposed in the exhaust line between the SCR and the second particulate filter.

Figure 2:
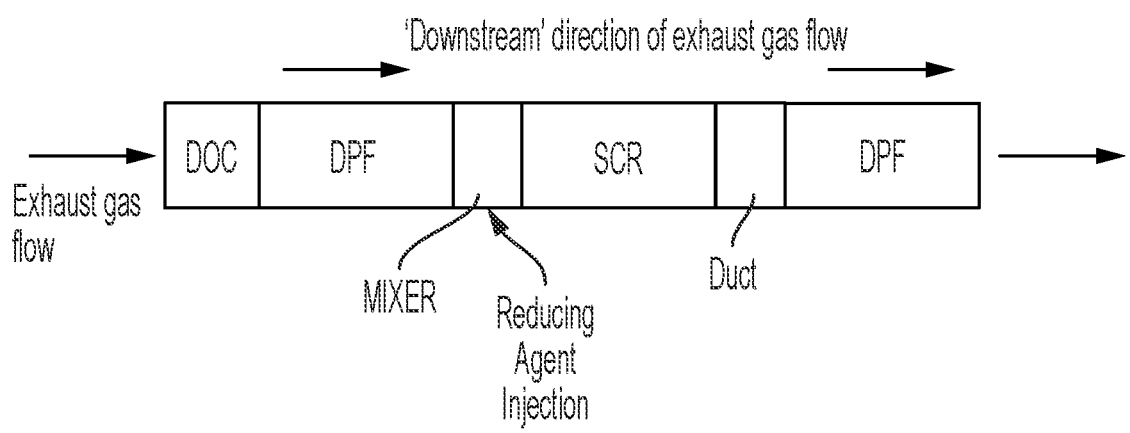
FIG. 2 schematically illustrates an apparatus or a subassembly or an exhaust system comprising an exhaust line comprising an oxidation catalyst+a first particulate filter+SCR unit+second particulate filter architecture, such as a DOC+DPF+SCR unit+DPF architecture, wherein the DOC is a Diesel Oxidation Catalyst, the SCR unit comprises an injector disposed upstream of a substrate provided with a Selective Catalytic Reduction catalyst material (SCR), with an optional duct disposed in the exhaust line between the SCR and the second particulate filter.

FIG. 2 schematically illustrates an apparatus or a subassembly or an exhaust system comprising an exhaust line comprising an oxidation catalyst+a first particulate filter+SCR unit+second particulate filter architecture, such as a DOC+DPF+SCR unit+DPF architecture, wherein the DOC is a Diesel Oxidation Catalyst, the SCR unit comprises an injector disposed upstream of a substrate provided with a Selective Catalytic Reduction catalyst material (SCR), with an optional duct disposed in the exhaust line between the SCR and the second particulate filter.

FIG. 3 lists various exhaust treatment apparatuses that were tested with a heavy duty diesel engine.

Figure 4:
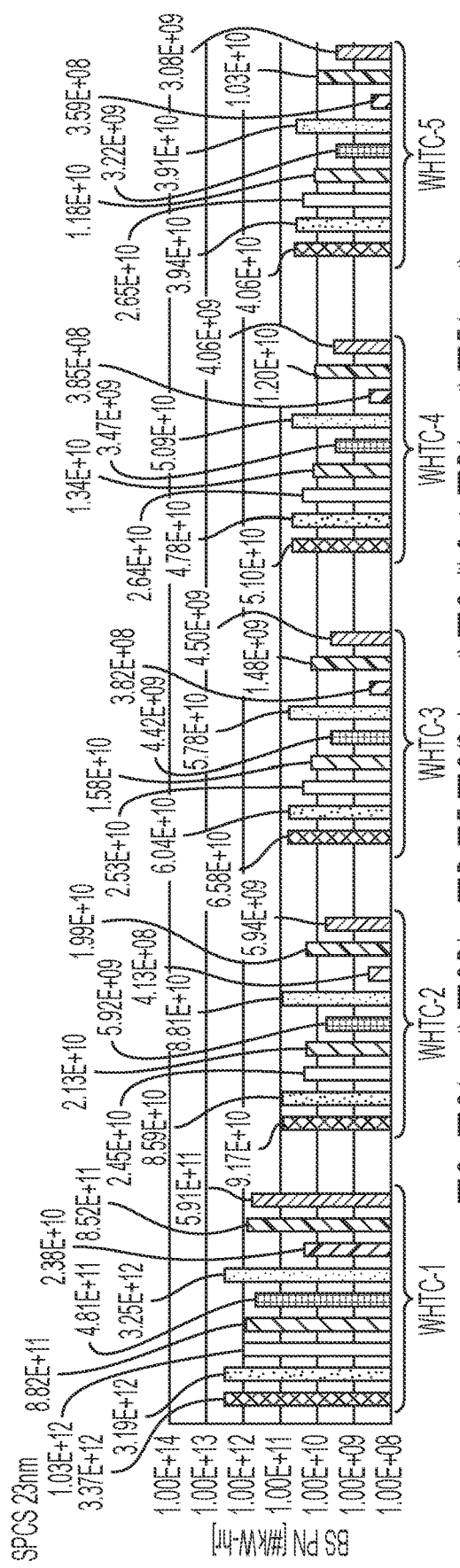
FIG. 4 schematically presents Euro VI based System Out Particulate Number Measurements performed on a Heavy Duty Diesel Engine for five World Harmonized Transient Cycle (WHTC) tests using a 23 nm solid particle counting system (SPCS) for various apparatus of FIG. 3.

FIG. 4 schematically presents Euro VI based System Out Particulate Number Measurements performed on a Heavy Duty Diesel Engine for five World Harmonized Transient Cycle (WHTC) tests using a 23 nm solid particle counting system (SPCS) for various apparatus of FIG. 3.

Figure 5:
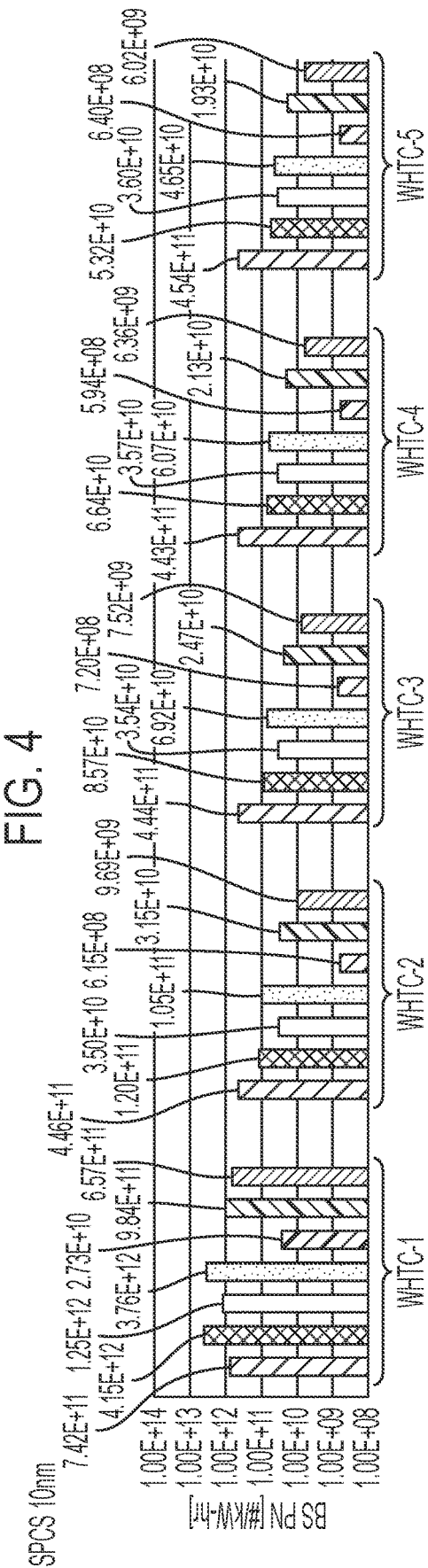
FIG. 5 schematically presents System Out Particulate Number Measurements performed on a Heavy Duty Diesel Engine for five World Harmonized Transient Cycle (WHTC) tests using a 10 nm solid particle counting system (SPCS) for various apparatus of FIG. 3.

FIG. 5 schematically presents System Out Particulate Number Measurements performed on a Heavy Duty Diesel Engine for five World Harmonized Transient Cycle (WHTC) tests using a 10 nm solid particle counting system (SPCS) for various apparatus of FIG. 3.

In some embodiments, the second particulate filter is coated, or supports, an ammonia oxidation catalyst.

In some embodiments, the SCR includes an ammonia oxidation catalyst at the downstream end; in other embodiments, the SCR does not include an ammonia oxidation catalyst at the downstream end.

In various other embodiments disclosed herein, the particulate filters are diesel particulate filters (DPFs) in configurations that include: DOC+SCR+DOC+DPF+SCR+DPF; SCR+DOC+DPF+SCR+DPF; SCR+DOC integrated DPF+SCR+DPF; DOC+SCR+DOC integrated DPF+SCR+DPF; DOC integrated DPF+SCR+DPF.

Figure 6:
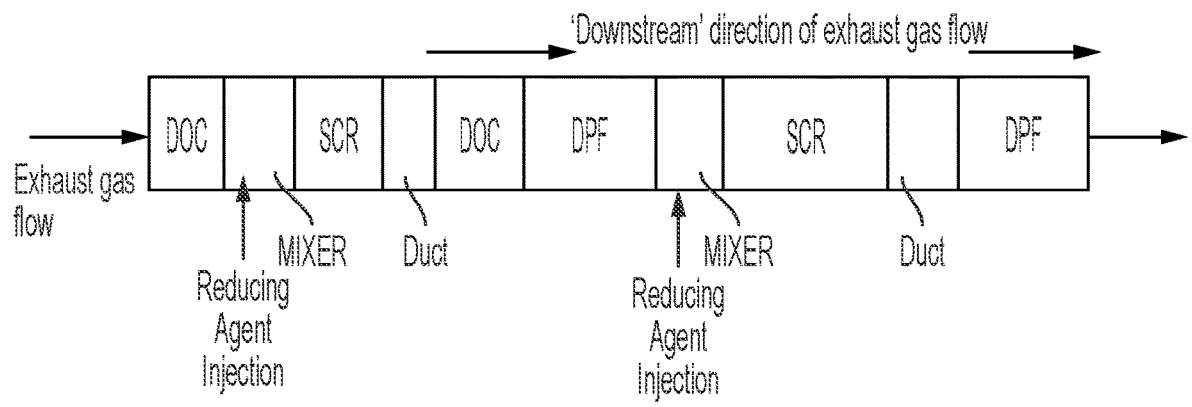
FIG. 6 schematically illustrates an embodiment of an exhaust line comprised of a DOC, a mixer with reducing agent injection, an SCR, a duct, a second DOC, a DPF, a second mixer with reducing agent injection, a second SCR, a duct, and a second DPF, connected in fluid communication such that exhaust gas flow can flow into the exhaust line and travel in a downstream direction serially through said exhaust line components.

FIG. 6 schematically illustrates an embodiment of an exhaust line comprised of a DOC, a mixer with reducing agent injection, an SCR, a duct, a second DOC, a DPF, a second mixer with reducing agent injection, a second SCR, a duct, and a second DPF, connected in fluid communication such that exhaust gas flow can flow into the exhaust line and travel in a downstream direction serially through said exhaust line components.

Figure 7:
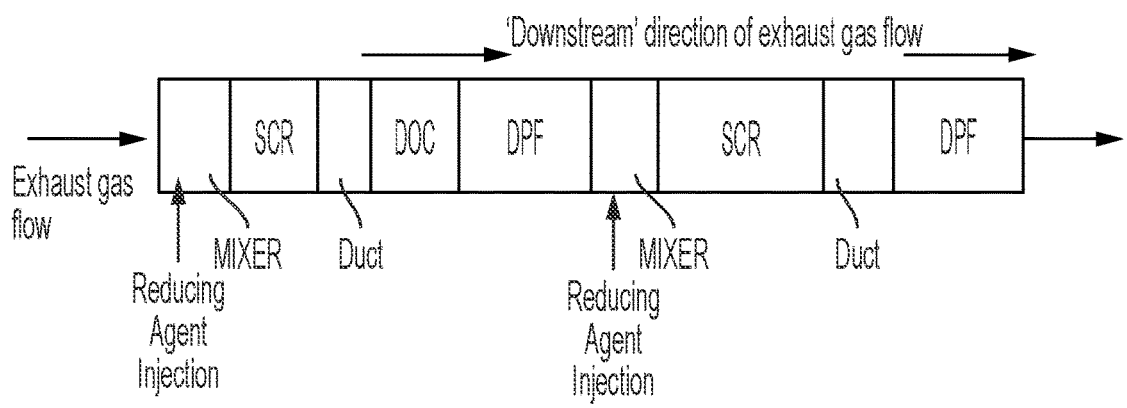
FIG. 7 schematically illustrates an embodiment of an exhaust line comprised of a mixer with reducing agent injection, an SCR, a duct, a DOC, a DPF, a second mixer with reducing agent injection, a second SCR, a duct, and a second DPF, connected in fluid communication such that exhaust gas flow can flow into the exhaust line and travel in a downstream direction serially through said exhaust line components.

FIG. 7 schematically illustrates an embodiment of an exhaust line comprised of a mixer with reducing agent injection, an SCR, a duct, a DOC, a DPF, a second mixer with reducing agent injection, a second SCR, a duct, and a second DPF, connected in fluid communication such that exhaust gas flow can flow into the exhaust line and travel in a downstream direction serially through said exhaust line components.

Figure 8:
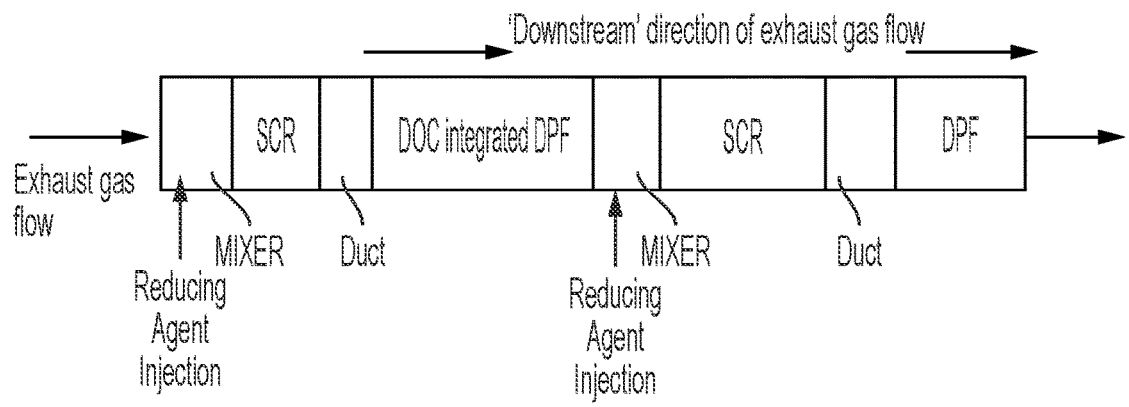
FIG. 8 schematically illustrates an embodiment of an exhaust line comprised of a mixer with reducing agent injection, an SCR, a duct, a DOC integrated DPF, a second mixer with reducing agent injection, a second SCR, a duct, and a second DPF, connected in fluid communication such that exhaust gas flow can flow into the exhaust line and travel in a downstream direction serially through said exhaust line components.

FIG. 8 schematically illustrates an embodiment of an exhaust line comprised of a mixer with reducing agent injection, an SCR, a duct, a DOC integrated DPF, a second mixer with reducing agent injection, a second SCR, a duct, and a second DPF, connected in fluid communication such that exhaust gas flow can flow into the exhaust line and travel in a downstream direction serially through said exhaust line components.

Figure 9:
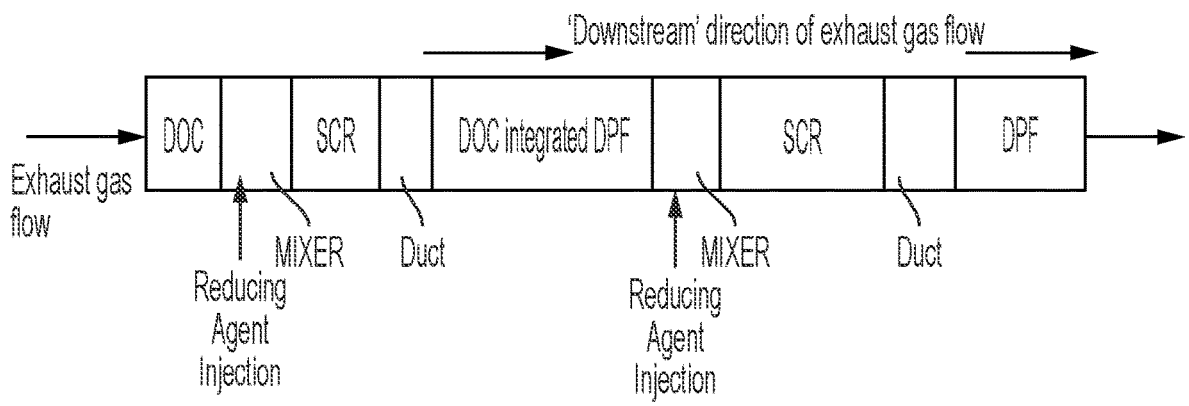
FIG. 9 schematically illustrates an embodiment of an exhaust line comprised of a DOC, a mixer with reducing agent injection, an SCR, a duct, a DOC integrated DPF, a second mixer with reducing agent injection, a second SCR, a duct, and a second DPF, connected in fluid communication such that exhaust gas flow can flow into the exhaust line and travel in a downstream direction serially through said exhaust line components.

FIG. 9 schematically illustrates an embodiment of an exhaust line comprised of a DOC, a mixer with reducing agent injection, an SCR, a duct, a DOC integrated DPF, a second mixer with reducing agent injection, a second SCR, a duct, and a second DPF, connected in fluid communication such that exhaust gas flow can flow into the exhaust line and travel in a downstream direction serially through said exhaust line components.

Figure 10:
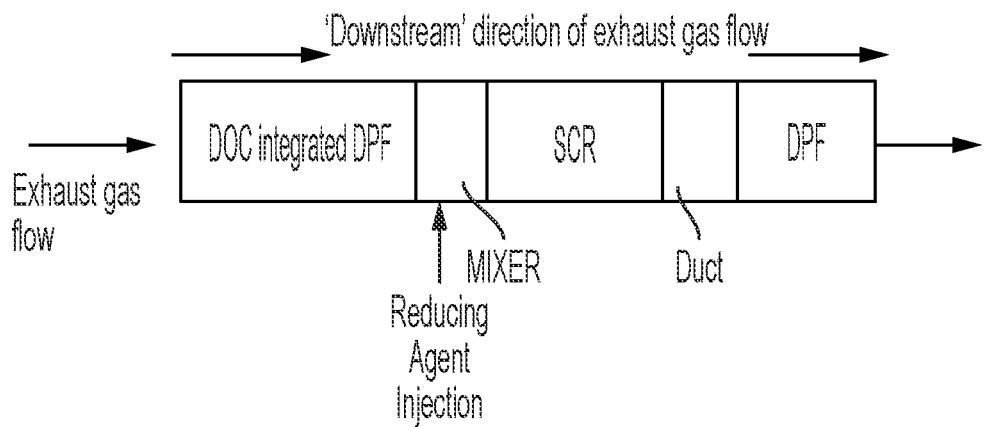
FIG. 10 schematically illustrates an embodiment of an exhaust line comprised of a DOC integrated DPF, a mixer with reducing agent injection, an SCR, a duct, and a second DPF, connected in fluid communication such that exhaust gas flow can flow into the exhaust line and travel in a downstream direction serially through said exhaust line components.

FIG. 10 schematically illustrates an embodiment of an exhaust line comprised of a DOC integrated DPF, a mixer with reducing agent injection, an SCR, a duct, and a second DPF, connected in fluid communication such that exhaust gas flow can flow into the exhaust line and travel in a downstream direction serially through said exhaust line components.

Figure 11:
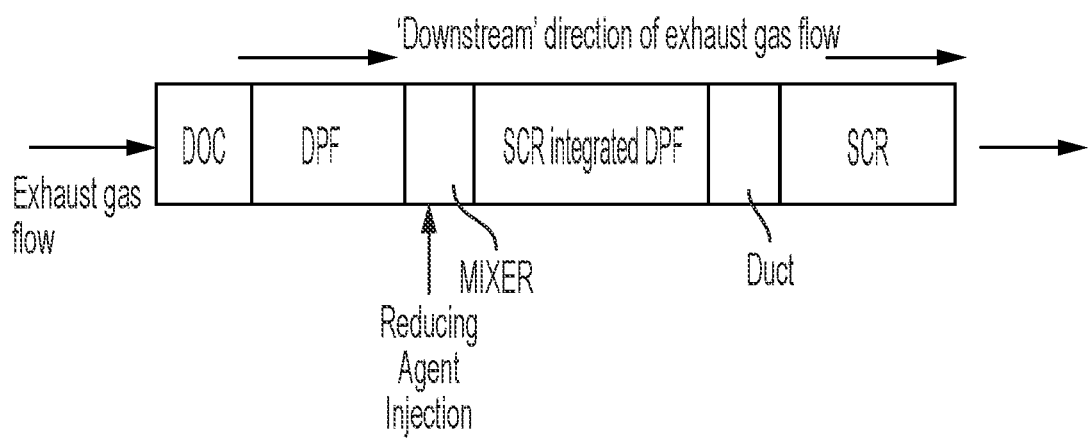
FIG. 11 schematically illustrates an embodiment of an exhaust line comprised of a DOC, a DPF, a mixer with reducing agent injection, an SCR integrated DPF, a duct, and an SCR, connected in fluid communication such that exhaust gas flow can flow into the exhaust line and travel in a downstream direction serially through said exhaust line components.

FIG. 11 schematically illustrates an embodiment of an exhaust line comprised of a DOC, a DPF, a mixer with reducing agent injection, an SCR integrated DPF, a duct, and an SCR, connected in fluid communication such that exhaust gas flow can flow into the exhaust line and travel in a downstream direction serially through said exhaust line components.

Figure 12:
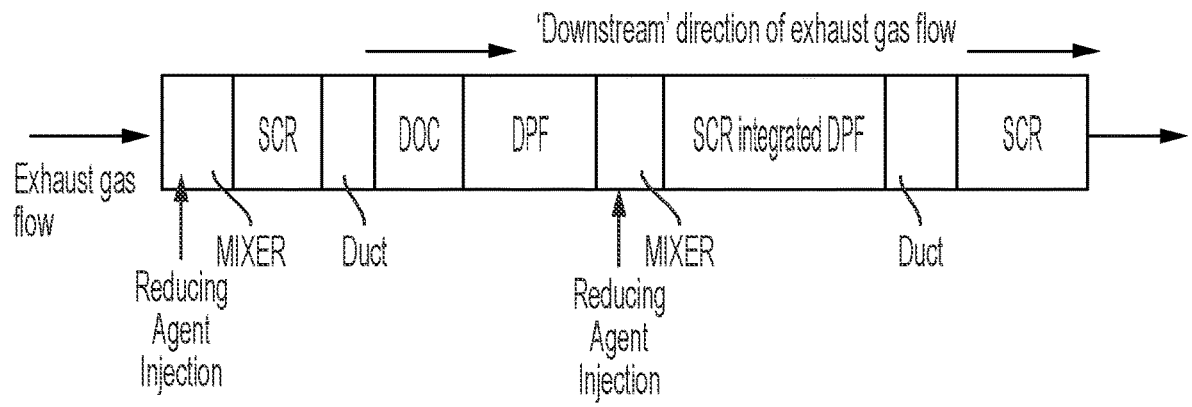
FIG. 12 schematically illustrates an embodiment of an exhaust line comprised of a mixer with reducing agent injection, an SCR, a duct, a DOC, a DPF, a second mixer with reducing agent injection, an SCR integrated DPF, a duct, and a second SCR, connected in fluid communication such that exhaust gas flow can flow into the exhaust line and travel in a downstream direction serially through said exhaust line components.

FIG. 12 schematically illustrates an embodiment of an exhaust line comprised of a mixer with reducing agent injection, an SCR, a duct, a DOC, a DPF, a second mixer with reducing agent injection, an SCR integrated DPF, a duct, and a second SCR, connected in fluid communication such that exhaust gas flow can flow into the exhaust line and travel in a downstream direction serially through said exhaust line components.

Figure 13:
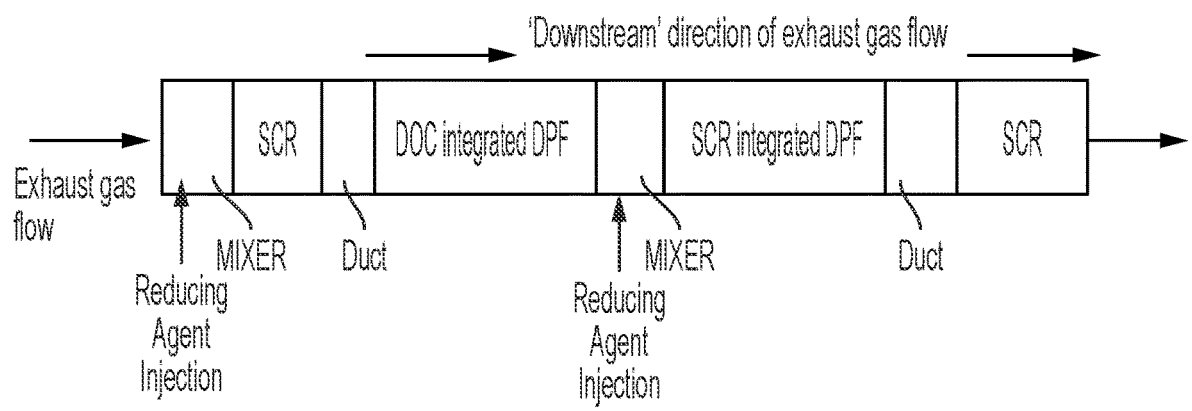
FIG. 13 schematically illustrates an embodiment of an exhaust line comprised of a mixer with reducing agent injection, an SCR, a duct, a DOC integrated DPF, a second mixer with reducing agent injection, an SCR integrated DPF, a duct, and a second SCR, connected in fluid communication such that exhaust gas flow can flow into the exhaust line and travel in a downstream direction serially through said exhaust line components.

FIG. 13 schematically illustrates an embodiment of an exhaust line comprised of a mixer with reducing agent injection, an SCR, a duct, a DOC integrated DPF, a second mixer with reducing agent injection, an SCR integrated DPF, a duct, and a second SCR, connected in fluid communication such that exhaust gas flow can flow into the exhaust line and travel in a downstream direction serially through said exhaust line components.

Figure 14:
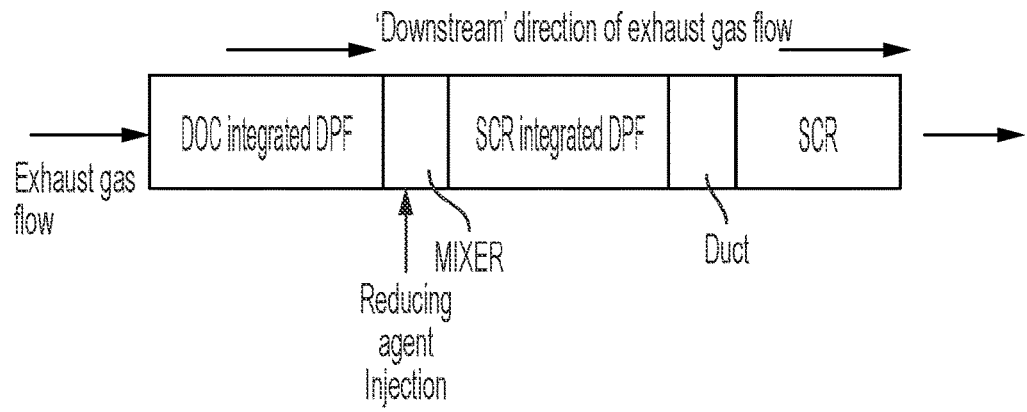
FIG. 14 schematically illustrates an embodiment of an exhaust line comprised of a DOC integrated DPF, a mixer with reducing agent injection, an SCR integrated DPF, a duct, and an SCR, connected in fluid communication such that exhaust gas flow can flow into the exhaust line and travel in a downstream direction serially through said exhaust line components.

FIG. 14 schematically illustrates an embodiment of an exhaust line comprised of a DOC integrated DPF, a mixer with reducing agent injection, an SCR integrated DPF, a duct, and an SCR, connected in fluid communication such that exhaust gas flow can flow into the exhaust line and travel in a downstream direction serially through said exhaust line components.

As seen in FIGS. 11-14, the SCR integrated filter is not the most downstream component, but the SCR integrated filter is downstream of the most downstream urea injector/mixer component.

Figure 15:
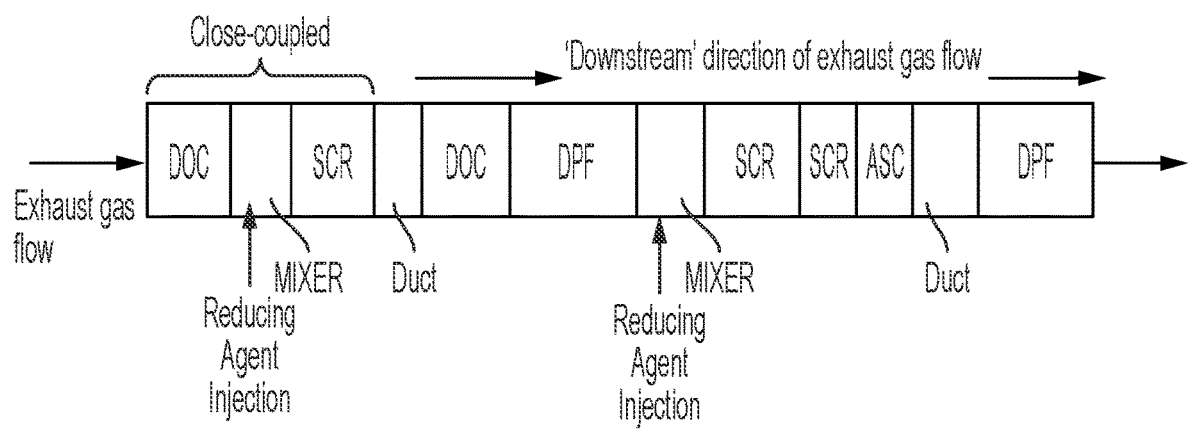
FIG. 15 schematically illustrates an embodiment of an exhaust line comprised of a DOC, a mixer with reducing agent injection, an SCR, a duct, a second DOC, a DPF, a second mixer with reducing agent injection, a second SCR, a third SCR, an ASC, a duct, and a second DPF, connected in fluid communication such that exhaust gas flow can flow into the exhaust line and travel in a downstream direction serially through said exhaust line components.

FIG. 15 schematically illustrates an embodiment of an exhaust line comprised of a DOC, a mixer with reducing agent injection, an SCR, a duct, a second DOC, a DPF, a second mixer with reducing agent injection, a second SCR, a third SCR, an ASC, a duct, and a second DPF, connected in fluid communication such that exhaust gas flow can flow into the exhaust line and travel in a downstream direction serially through said exhaust line components. The first DOC and the first SCR are referred to as close-couple or close-coupled catalysts as they are configurable to be in a close-coupled position with respect to a vehicle engine near the inlet of the exhaust line. In FIG. 15, the "second DPF", or the most downstream DPF, is downstream of all of the other upstream components, and can serve as a last trap for particulate matter before the exhaust gas exits the exhaust line.

Reference throughout this specification to "one embodiment," "certain embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments.

Although the disclosure herein has been described with reference to particular embodiments, those skilled in the art will understand that the embodiments described are merely illustrative of the principles and applications of the present disclosure. It will be apparent to those skilled in the art that various modifications and variations can be made to the method and apparatus of the present disclosure without departing from the spirit and scope of the disclosure. Thus, the present disclosure can include modifications and variations that are within the scope of the appended claims and their equivalents.

What is claimed is:

1. An exhaust treatment apparatus for treating an exhaust stream flowing through an exhaust line housing in a downstream direction from an upstream location of the exhaust line housing to a downstream location, the exhaust treatment apparatus comprising:
    a first particulate filter;
    an SCR unit disposed downstream of the first particulate filter; and
    a second particulate filter disposed downstream of the SCR unit;
    wherein the first particulate filter, the SCR unit, and the second particulate filter are disposed serially in the exhaust line housing and are configured to allow the exhaust stream to flow serially through the first particulate filter, subsequently through the SCR unit, and subsequently through the second particulate filter wherein the first particulate filter is comprised of a first honeycomb body comprised of intersecting porous ceramic walls comprising a first bulk average porosity of 40-65% as measured by mercury porosimetry, and the second particulate filter is comprised of a second honeycomb body comprised of intersecting porous ceramic walls comprising a second bulk average porosity of 35-55% as measured by mercury porosimetry.

2. The apparatus of claim 1 wherein the SCR unit comprises a reducing agent doser configured to inject a reducing agent into the exhaust gas in the exhaust line housing downstream of the first particulate filter.

3. The apparatus of claim 1 wherein the SCR unit further comprises a selective catalytic reduction catalyst.

4. The apparatus of claim 1 wherein the first particulate filter is comprised of a first honeycomb body comprised of intersecting porous ceramic walls comprising a first bulk average porosity as measured by mercury porosimetry, and the second particulate filter is comprised of a second honeycomb body comprised of intersecting porous ceramic walls comprising a second bulk average porosity as measured by mercury porosimetry, wherein the second honeycomb body comprises a second bulk median pore size which is less than a first bulk median pore size of the first honeycomb body.

5. The apparatus of claim 1 wherein the first bulk average porosity is 48-62%.

6. The apparatus of claim 1 wherein the first bulk average porosity is 50-55%.

7. The apparatus of claim 1 wherein the second bulk average porosity is 40-55%.

8. The apparatus of claim 1 wherein the second honeycomb body comprises a second bulk median pore size of 5-22 micrometers.

9. The apparatus of claim 1 wherein the second honeycomb body comprises a second bulk median pore size which is less than a first bulk median pore size of the first honeycomb body.

10. An exhaust treatment apparatus for treating an exhaust stream flowing through an exhaust line housing in a downstream direction from an upstream location of the exhaust line housing to a downstream location, the exhaust treatment apparatus comprising:
    a first particulate filter;
    an SCR unit disposed downstream of the first particulate filter; and
    a second particulate filter disposed downstream of the SCR unit;
    wherein the first particulate filter, the SCR unit, and the second particulate filter are disposed serially in the exhaust line housing and are configured to allow the exhaust stream to flow serially through the first particulate filter, subsequently through the SCR unit, and subsequently through the second particulate filter wherein the first particulate filter is comprised of a first honeycomb body comprised of intersecting porous ceramic walls comprising a first bulk median pore size of 12-30 micrometers as measured by mercury porosimetry, and the second particulate filter is comprised of a second honeycomb body comprised of intersecting porous ceramic walls comprising a second bulk median pore size of 2-22 micrometers as measured by mercury porosimetry, and wherein the second bulk median pore size is less than the first bulk median pore size.

11. The apparatus of claim 10 wherein the first particulate filter is comprised of a honeycomb body comprised of intersecting porous ceramic walls comprising a bulk average porosity of 40-65% as measured by mercury porosimetry.

12. The apparatus of claim 11 wherein porous ceramic walls comprising a bulk average porosity of 42-55% as measured by mercury porosimetry.

13. The apparatus of claim 11 wherein the porous ceramic walls comprise a bulk median pore size of 5 to 1 µm as measured by mercury porosimetry.

14. The apparatus of claim 11 wherein the porous ceramic walls comprise a bulk median pore size of 7 to 12 µm as measured by mercury porosimetry.

15. An exhaust treatment apparatus for treating an exhaust stream flowing through an exhaust line housing in a downstream direction from an upstream location of the exhaust line housing to a downstream location, the exhaust treatment apparatus comprising:
    a first particulate filter;

an SCR unit disposed downstream of the first particulate filter; and a second particulate filter disposed downstream of the SCR unit;

wherein the first particulate filter, the SCR unit, and the second particulate filter are disposed serially in the exhaust line housing and are configured to allow the exhaust stream to flow serially through the first particulate filter, subsequently through the SCR unit, and subsequently through the second particulate filter wherein the first particulate filter is comprised of a first honeycomb body comprised of intersecting porous ceramic walls comprising a first bulk average porosity as measured by mercury porosimetry, and the second particulate filter is comprised of a second honeycomb body comprised of intersecting porous ceramic walls comprising a second bulk average porosity as measured by mercury porosimetry, and the second bulk average porosity is greater than the first bulk average porosity.

16. The apparatus of claim 15 wherein the first particulate filter is comprised of a first honeycomb body comprised of intersecting porous ceramic walls defining axial channels, wherein the first honeycomb body further comprises plugs selectively disposed in at least some of the axial channels to further define inlet channels and outlet channels and to provide a plurality of gas flow paths through selected porous ceramic walls.

17. The apparatus of claim 16 wherein at least some of the inlet channels have a cross-sectional channel open area greater than a cross-sectional channel open area of at least some of the outlet channels.

18. The apparatus of claim 16 wherein the second particulate filter is comprised of a second honeycomb body comprised of intersecting porous ceramic walls defining axial channels, wherein the second honeycomb body further comprises plugs selectively disposed in at least some of the axial channels to further define inlet channels and outlet channels and to provide a plurality of gas flow paths through selected porous ceramic walls.

19. The apparatus of claim 18 wherein a majority of the inlet channels and a majority of the outlet channels in the second particulate filter have essentially the same cross-sectional channel open area.

* * * * *